US010018497B2

(12) United States Patent
Lu

(10) Patent No.: US 10,018,497 B2
(45) Date of Patent: Jul. 10, 2018

(54) TROLLEY CASE CAPABLE OF DISPLAYING WEIGHT IN A STATIC STATE CONSISTING OF A WEIGHING TRANSDUCER AFFIXED TO THE CASTER

(71) Applicant: Dongguan Meiermei Traveling Appliance Co., Ltd., Dongguan (CN)

(72) Inventor: Zhiyong Lu, Dongguan (CN)

(73) Assignee: DONGGUAN MEIERMEI TRAVELING APPLIANCE CO., LTD., Dongguan, Guangdong (CN)

( * ) Notice: Subject to any disclaimer, the term of this patent is extended or adjusted under 35 U.S.C. 154(b) by 162 days.

(21) Appl. No.: 15/275,501

(22) Filed: Sep. 26, 2016

(65) Prior Publication Data

US 2018/0087955 A1    Mar. 29, 2018

(51) Int. Cl.
| | |
|---|---|
| G01G 19/52 | (2006.01) |
| A45C 5/14 | (2006.01) |
| B60C 99/00 | (2006.01) |
| G01G 3/14 | (2006.01) |
| G01G 19/58 | (2006.01) |
| G01G 23/00 | (2006.01) |
| A45C 5/03 | (2006.01) |
| A45C 15/00 | (2006.01) |
| B60B 33/00 | (2006.01) |

(52) U.S. Cl.
CPC .............. *G01G 19/52* (2013.01); *A45C 5/03* (2013.01); *A45C 5/14* (2013.01); *A45C 15/00* (2013.01); *G01G 3/1402* (2013.01); *G01G 23/005* (2013.01); *B60B 33/00* (2013.01); *G01G 19/58* (2013.01)

(58) Field of Classification Search
CPC .......... G01G 19/52; G01G 19/58; G01G 3/14; G01G 3/1402; G01G 23/005; A45C 5/03; A45C 5/14; A45C 5/2005; A45C 15/00; B60B 33/00
See application file for complete search history.

(56) References Cited

U.S. PATENT DOCUMENTS

| | | | | |
|---|---|---|---|---|
| 3,526,921 A | * | 9/1970 | Aupke | ................ A45C 5/143 |
| | | | | 16/38 |
| 4,054,964 A | * | 10/1977 | Kaneko | .................... A45C 5/14 |
| | | | | 16/20 |
| 4,422,212 A | * | 12/1983 | Sheiman | ............... A45C 5/143 |
| | | | | 16/29 |
| 4,788,741 A | * | 12/1988 | Hilborn | ............... B60B 33/0002 |
| | | | | 16/35 R |

(Continued)

FOREIGN PATENT DOCUMENTS

| | | | | |
|---|---|---|---|---|
| DE | 19619579 A1 | * | 11/1997 | ......... B60B 33/0002 |
| DE | 102009001624 A1 | * | 9/2010 | ............. A45C 5/143 |
| DE | 10201105200 A1 | * | 4/2013 | |

*Primary Examiner* — Randy Gibson
(74) *Attorney, Agent, or Firm* — Leong C. Lei

(57) ABSTRACT

A trolley case capable of displaying weight in a static state allows the bracket fixing shaft not to offset in a radial direction through the configurations of a directional bearing and shaft liner, and allows a weighing transducer to sense the weight of a case body accurately by installing the weighing transducer on the directional bearing and fixing the weighing transducer to the upper end face of the bracket fixing shaft, thereby not causing a weight displaying value to change, realizing a static display, and thus giving users the convenience of use.

6 Claims, 4 Drawing Sheets

(56) References Cited

U.S. PATENT DOCUMENTS

| | | | | |
|---|---|---|---|---|
| 5,199,131 | A * | 4/1993 | Harris | B60B 33/00 16/18 R |
| 5,510,581 | A * | 4/1996 | Angel | G01G 3/141 177/211 |
| 5,568,671 | A * | 10/1996 | Harris | B60B 33/0002 16/18 R |
| 5,823,278 | A * | 10/1998 | Geringer | G01G 19/445 177/144 |
| 5,831,221 | A * | 11/1998 | Geringer | G01G 19/445 177/144 |
| 5,875,519 | A * | 3/1999 | Chou | B60B 33/0002 16/44 |
| 6,484,359 | B1 * | 11/2002 | Guttmann | B60B 33/045 16/44 |
| 6,952,972 | B2 * | 10/2005 | Schulze | G01G 19/4142 73/862.041 |
| 7,051,603 | B2 * | 5/2006 | Loher | G01G 3/1414 73/856 |
| 7,084,357 | B2 * | 8/2006 | Roberts | A45C 15/00 177/131 |
| 9,448,099 | B2 * | 9/2016 | Zhao | A45C 15/00 |
| 9,804,018 | B1 * | 10/2017 | Muccillo | G08B 21/182 |
| 9,861,170 | B1 * | 1/2018 | Hamaty | A45C 9/00 |
| 2009/0314596 | A1 * | 12/2009 | Miyoshi | A45C 5/14 190/18 A |
| 2015/0113766 | A1 * | 4/2015 | Hou | A45C 5/14 16/45 |
| 2015/0360512 | A1 * | 12/2015 | Tsai | B60B 33/0018 16/38 |
| 2016/0231166 | A1 * | 8/2016 | Malhotra | G01G 19/52 |

* cited by examiner

TROLLEY CASE CAPABLE OF DISPLAYING WEIGHT IN A STATIC STATE CONSISTING OF A WEIGHING TRANSDUCER AFFIXED TO THE CASTER

TECHNICAL FIELD OF THE INVENTION

The present invention relates to a trolley case, and more particularly to a trolley case capable of displaying weight in a static state.

DESCRIPTION OF THE PRIOR ART

As we all know, trolley cases are easy for carrying clothing and articles and can be moved conveniently such that they are indispensable for travel, and therefore, they are broadly used. Conventional trolley cases include a case body, pull rod and rollers, being single in function. When a person is on travel by airplane, the carried trolley case must be weighted upon check-in, and extra shipping fee must be paid if it is overweight. But, persons always accommodate articles in a luggage upon pack-up according to their requirements, and sometimes ignore the weight of articles or cannot find a weighing device for a moment to weight the articles such that they only can carry out the accommodation by feeling and must pay extra shipping fee easily upon the arrival at airport because of overweight, which brings them a lot of unnecessary trouble. Accompanying the improvement of the current society electronic degree, conventional trolley cases hardly satisfy customers' requirements. Therefore, trolley cases with a self weighing module are developed. However, since the installation locations of the self weighing modules are not reasonable, the weighing display has a larger error. In addition, the rotation of a case body is prone to lead to changes in weighing display, which brings inconvenience to uses.

SUMMARY OF THE INVENTION

The present invention proposes a trolley case capable of displaying weight in a static state, including a case body and a plurality of casters, installed on the bottom of the case body; the case body includes an inner protecting cover and a plurality of caster seats mounted on the bottom of the inner protecting cover, the casters each includes a tire bracket and a tire installed on the tire bracket, the tire bracket is mounted rotatably on the caster seat through a bracket fixing shaft, the caster seat is fixed with a directional bearing put around the bracket fixing shaft, a shaft liner is sandwiched between the directional bearing and bracket fixing shaft, the directional bearing is fixed with a weighing transducer fixed to the upper end face of the bracket fixing shaft, the weighing transducer is configured with a deformation limit sheet fixed to the directional bearing and pressed against the bottom of the inner protecting cover, and the weighing transducer is sandwiched tightly between the deformation limit sheet and directional bearing.

Preferably, a first fixing hole is respectively configured on two ends of the weighing transducer, two second fixing holes are configured on the directional bearing, the first fixing holes and respective second fixing holes being facing each other and fixed together through respective fixing elements.

Preferably, a third fixing hole is configured on the weighing transducer, and a rivet is passed through the third fixing hole and fixed to the upper end face of the bracket fixing shaft.

Preferably, a recess is indented on the surface of the directional bearing, an engagement groove is configured on the bracket fixing shaft close to the upper end thereof, and a blocking sheet is engaged with the engagement groove, the blocking sheet being positioned in the recess and propped against the upper end face of the shaft liner.

Preferably, each corner of the bottom of the case body is configured with one of said casters, and the casters each is configured with the directional bearing, shaft liner, weighing transducer and deformation limit sheet.

Preferably, a draw rod seat is configured on one side of the top of the case body, a display screen on the surface of the draw rod seat, and the display screen is in electric connection with the weighing transducer through a connecting line.

The present invention has obvious advantages and beneficial effects compared with the prior art. Specifically, it can be known from the above technical solutions that according to the present invention, the bracket fixing shaft being not to offset in a radial direction through the configurations of a directional bearing and shaft liner, and a weighing transducer being used to sense the weight of a case body accurately by installing the weighing transducer on the directional bearing and the weighing transducer being fixed to the upper end face of the bracket fixing shaft will prevent a weight displaying value from changing, thereby realizing a static display, and thus giving uses the convenience of use.

DETAILED DESCRIPTION OF THE PREFERRED EMBODIMENTS

Figure 1:
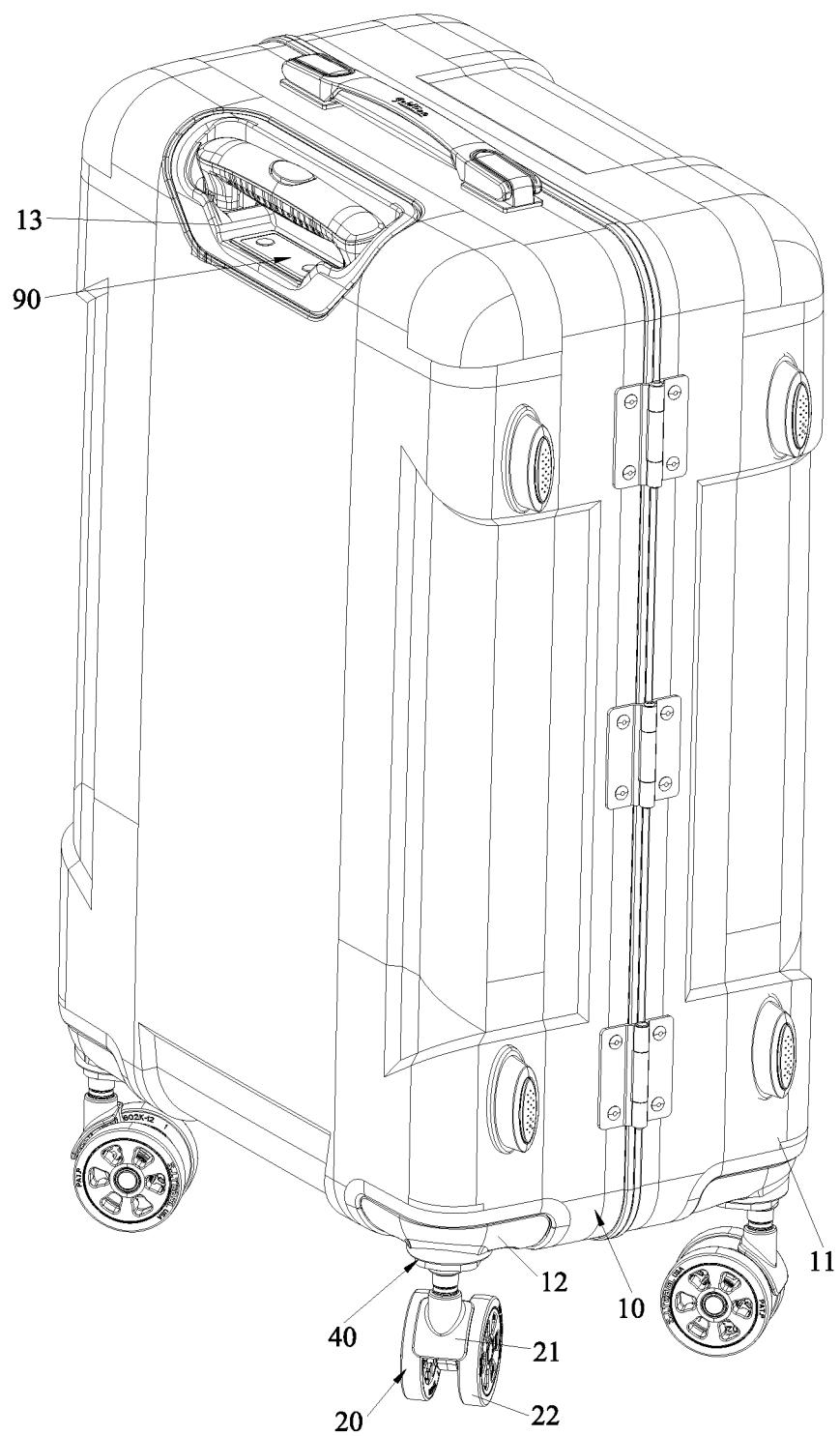
FIG. 1 is a perspective view of a preferred embodiment according to the present invention.
Figure 2:
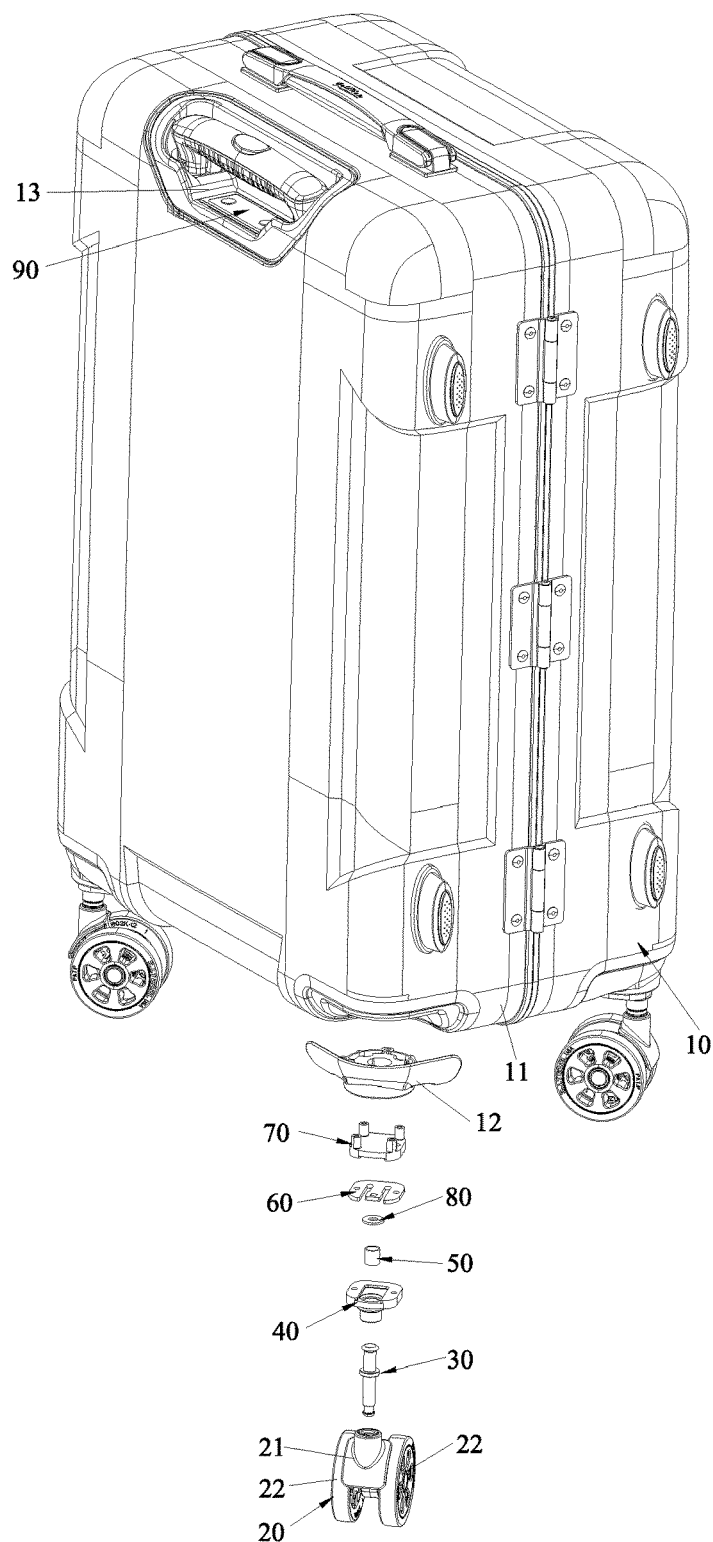
FIG. 2 is a partly exploded view of the embodiment according to the present invention.
Figure 3:
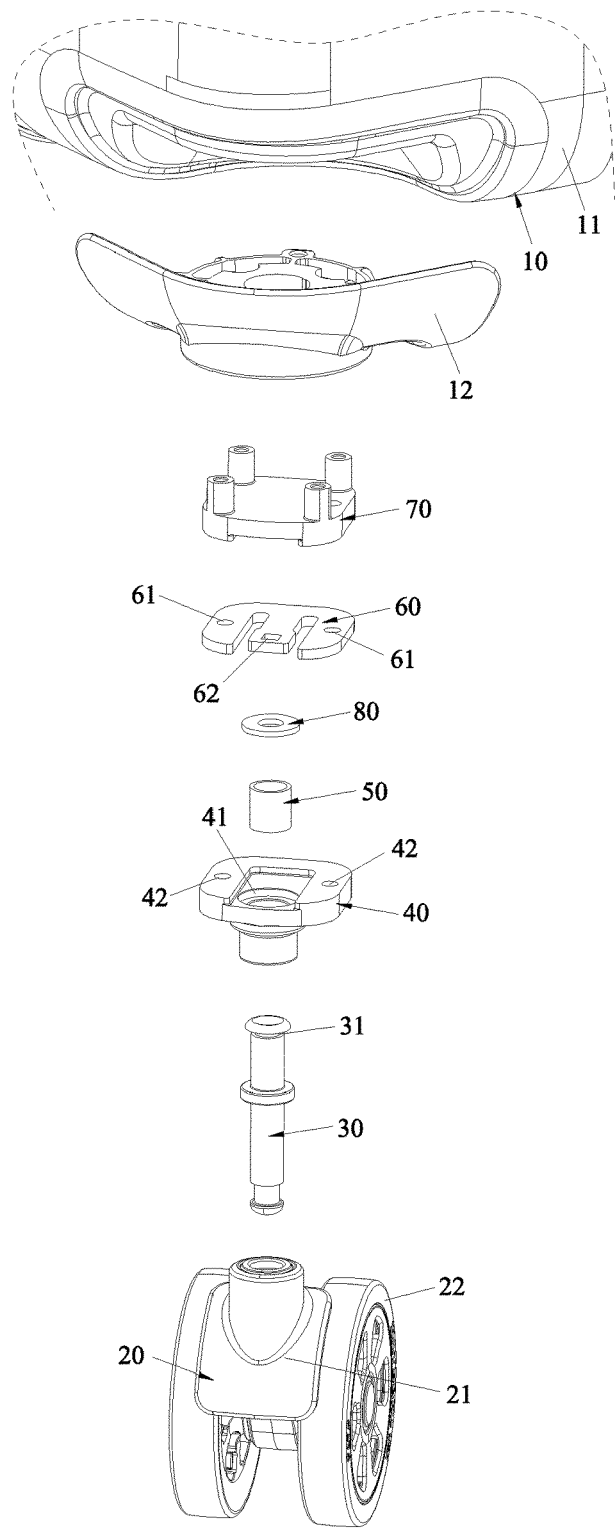
FIG. 3 is an enlarge view of the exploded parts shown in FIG. 2.
Figure 4:
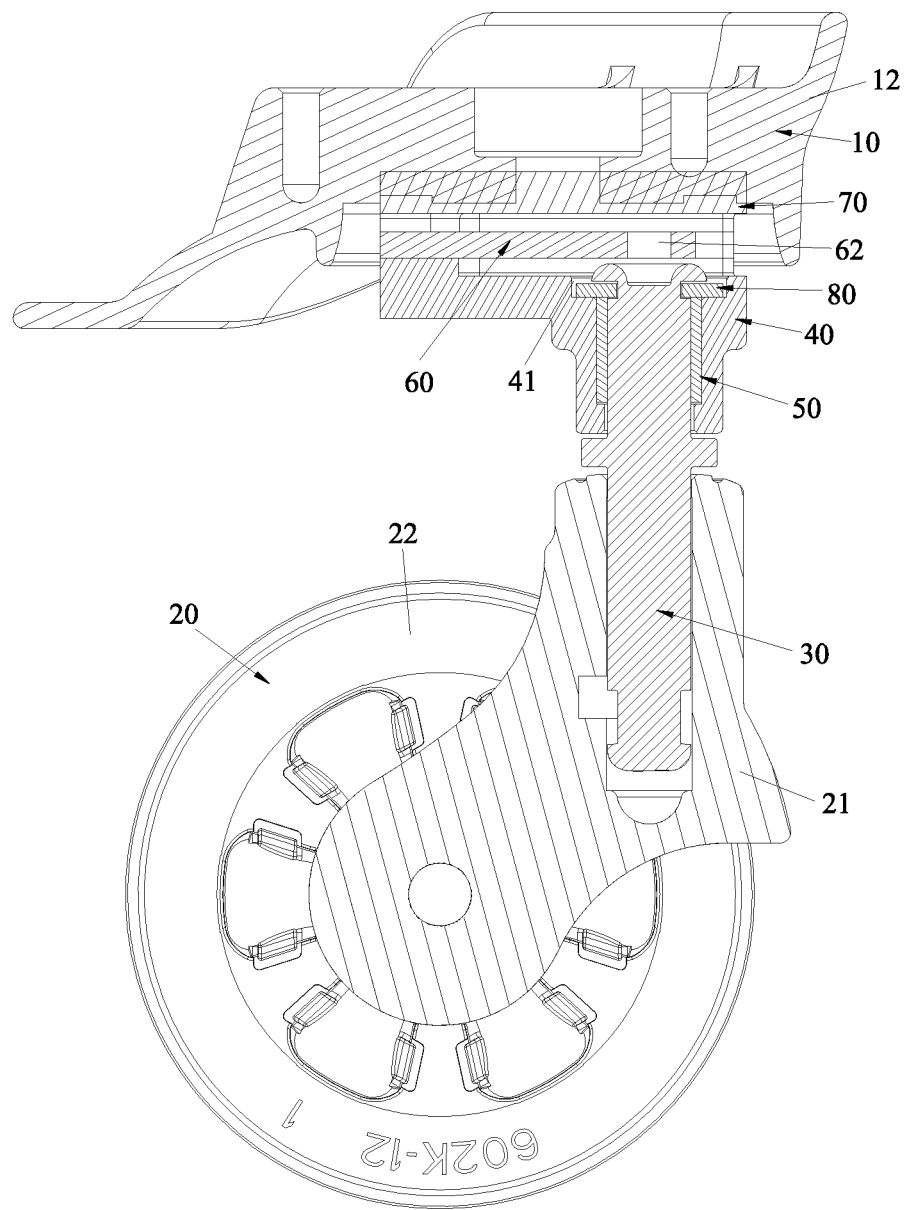
FIG. 4 is a partly cross-sectional view of the embodiment according to the present invention.

Referring to FIGS. 1 to 4, illustrating a specific structure of a preferred embodiment according to the present invention, a trolley case of the present invention includes a case body 10 and a plurality of casters 20.

The plurality of casters 20 are mounted on the bottom of the case body 10; the case body 10 includes an inner protecting cover 11 and a plurality of caster seats installed on the bottom of the inner protecting cover 11. The casters 20 each includes a tire bracket 21 and a tire 22 mounted on the tire bracket 21, where the tire bracket 21 is mounted rotatably on the caster seat 12 through a bracket fixing shaft 30, a directional bearing 40 is fixed on the caster seat 12 and put around the bracket fixing shaft 30, and a shaft liner 50 is sandwiched between the directional bearing 40 and the bracket fixing shaft 30. In the embodiment, a recess 41 is configured on the surface of the directional bearing 40, an engagement groove 31 the bracket fixing shaft 30 close to the upper end thereof, and a blocking sheet 80 is engaged with the engagement groove 31, where the blocking sheet 80 is positioned in the recess 41 and propped against the upper end face of the shaft liner 50.

The directional bearing 40 is configured with a weighing transducer 60, which is fixed to the upper end face of the bracket fixing shaft 30, and on which a deformation limit sheet 70 is configured, where the deformation limit sheet 70 is fixed to the directional bearing 40 and pressed against the bottom of the inner protecting cover 11. In addition, the weighing transducer 60 is sandwiched fixedly between the deformation limit sheet 70 and directional bearing 40. In the embodiment, a fixing hole 61 is respectively configured on the two ends of the weighing transducer 60, two second fixing holes 42 are configured on the directional bearing 40, and the fixing holes 61 and the respective second fixing holes are facing each other and connected fixedly with each other through respective fixing elements (not shown in the figures). Furthermore, a third fixing hole 62 is configured on the weighing transducer 60, and a rivet (not shown in the figure) is passed through the third fixing hole 60 to fix the upper end face of the bracket fixing shaft 30 to the weighing transducer 60.

Furthermore, one of the casters 20 is respectively configured on the four corners of the bottom of the case body 10, and the casters 20 each have the directional bearing 40, shaft liner 40, weighing transducer 60 and deformation limit sheet 70 mentioned above.

In addition, one side of the top of the case body 10 is provided with a draw rod seat 13, on the surface of which a display screen 90 is configured, the display screen 90 being in electric connection with the weighing transducer 60 through a connecting line (not shown in the figures).

Upon use, since the weighing transducer 60 is in electric connection with the display screen 90 through the connecting line and the weight of the case body 10 is concentrated on the weighing transducers 60, the weight data obtained by the weighing transducers 60 will be transferred to to the display screen 90 for displaying through the connecting line.

The present invention is designed to focus on that the configuration of the directional bearing and shaft liner makes the bracket fixing shaft not offset in a radial ction, and the weighing transducer being installed on the directional bearing and the weighing transducer being fixed to the top end face of the bracket fixing shaft allow the weighing transducer to sense the weight of the case body accurately so that the case body will not cause the weight display value to be changed upon the rotation thereof, thereby achieving a static display, giving users the convenience of use.

I claim:

1. A trolley case capable of displaying weight in a static state, comprising a case body and a plurality of casters, said plurality of casters being installed on a bottom of said case body, wherein said case body comprises an inner protecting cover and a plurality of caster seats mounted on a bottom of said inner protecting cover, said casters each comprises a tire bracket and a tire installed on said tire bracket, said tire bracket is mounted rotatably on said caster seat through a bracket fixing shaft, said caster seat is configured with a directional bearing put around said bracket fixing shaft, a shaft liner is sandwiched between said directional bearing and bracket fixing shaft, said directional bearing is configured with a weighing transducer fixed to a upper end face of said bracket fixing shaft, said weighing transducer is configured with a deformation limit sheet fixed to said directional bearing and pressed against said bottom of said inner protecting cover, and said weighing transducer is sandwiched tightly between said deformation limit sheet and directional bearing.

2. The trolley case according to claim 1, wherein a first fixing hole is respectively configured on two ends of said weighing transducer, two second fixing holes are configured on said directional bearing, said first fixing holes and respective second fixing holes being facing each other and fixed together through respective fixing elements.

3. The trolley case according to claim 2, wherein a third fixing hole is configured on said weighing transducer, and a rivet is passed through said third fixing hole and fix said weighing transducer to a upper end face of said bracket fixing shaft.

4. The trolley case according to claim 1, wherein a recess is configured on a surface of said directional bearing, an engagement groove is configured on said bracket fixing shaft close to a upper end thereof, and a blocking sheet is engaged with the engagement groove, said blocking sheet being positioned in said recess and propped against a upper end face of said shaft liner.

5. The trolley case according to claim 1, wherein each corner of said bottom of said case body is configured with one of said casters, and said casters each is configured with said directional bearing, shaft liner, weighing transducer and deformation limit sheet.

6. The trolley case according to claim 1, wherein a draw rod seat is configured on one side of a top of said case body, a display screen on a surface of said draw rod seat, and said display screen is in electric connection with said weighing transducer through a connecting line.

* * * * *